July 25, 1961 W. O. STANTON 2,993,698

PHONOGRAPH PICK-UP ARM

Filed May 31, 1957 2 Sheets-Sheet 1

INVENTOR
Walter O. Stanton
BY
Kane, Dalsimer and Kane
ATTORNEYS

PHONOGRAPH PICK-UP ARM

Filed May 31, 1957 2 Sheets-Sheet 2

INVENTOR
Walter O. Stanton
BY
Kane, Dalsimer and Kane
ATTORNEYS 2,993,698

PHONOGRAPH PICK-UP ARM

Walter O. Stanton, Laurel Hollow Road, Laurel Hollow, N.Y.

Filed May 31, 1957, Ser. No. 662,867
3 Claims. (Cl. 274—23)

This invention relates generally to phonograph apparatus, and more particularly to a phonograph pick-up arm.

Modern hi-fidelity phonograph apparatus require precision components. For the best reproduction of sound in the use of a phonograph the tracking force must be accurately determined and the pick-up head and arm should be light in weight. The weight of the pick-up head and pick-up arm must be so adjusted that the tracking force can be precisely regulated. The tone arm or pick-up arm that is used has to be adequately damped so that vibrations in the vicinity of the phonograph will not distort the sound being reproduced.

The invention herein disclosed has as its principal object the furnishing of a new phonograph pick-up arm which is light in weight and presents a minimum of tracking force.

Another object of this invention is to provide a phonograph pick-up arm which presents low distortion and a minimum tracking error to the system.

A further object of this invention is to provide a phonograph pick-up arm which is adequately damped and has suspension means which has a minimum effect upon movement of the arm.

A further object of this invention is to provide a phonograph pick-arm having means by which the tracking force can be adjusted.

A phonograph pick-up arm embodying the invention and the manner of using the same is described herein with references to the drawings in which.

Figure 1:
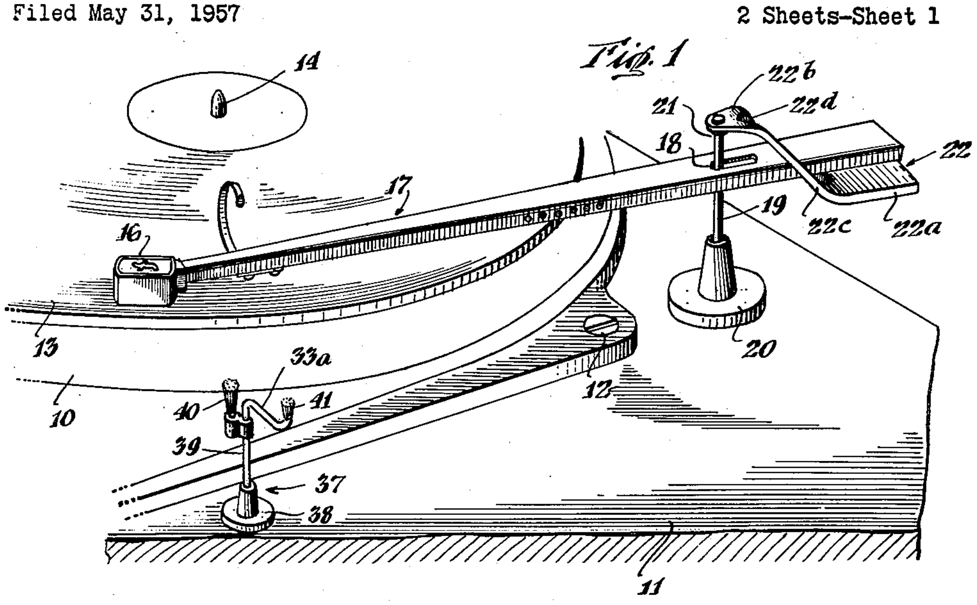
FIG. 1 is a perspective view of a phonograph pick-up arm constructed in accordance with the teachings of this invention showing the arm in operative relationship with a phonograph turntable and disc.
Figure 2:
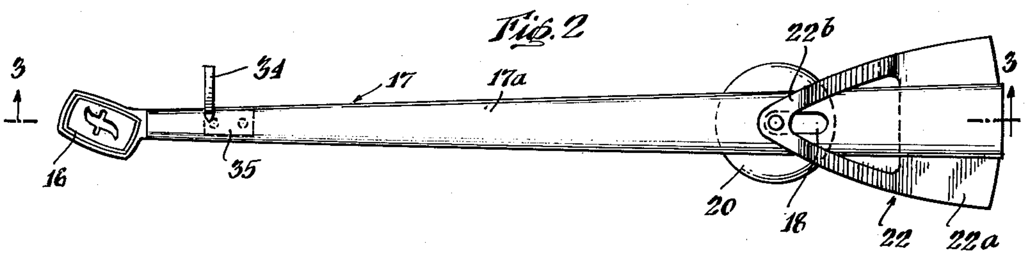
FIG. 2 is a top plan view of the phonograph pick-up arm shown in FIG. 1.

Phonograph turntable 10 is shown in FIG. 1, rigidly fastened to surface 11 by means of screws 12. Phonograph disc 13 lies on turntable 10 and can rotate with it about axial member 14.

Figures 3, 4:
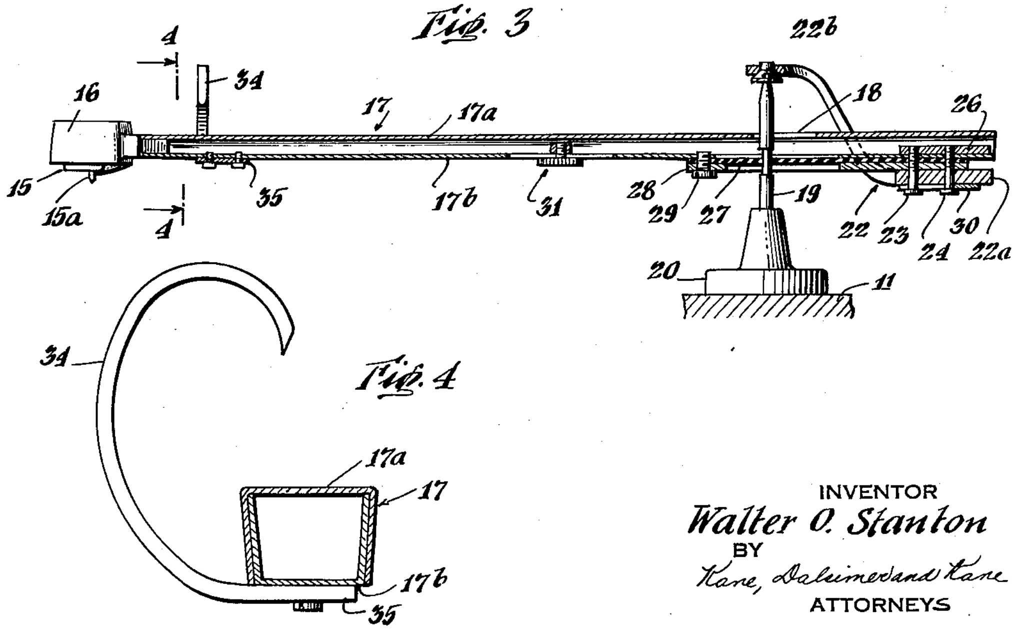
FIG. 3 is a sectional view taken along the line 3—3 in the direction of the arrows as indicated in FIG. 2.
FIG. 4 is a partially sectional view taken along the line 4—4 in the direction of the arrows as indicated in FIG. 3, showing in detail the means attached to the phonograph pick-up arm by which an operator can manipulate the arm.

Stylus assembly 15, which is seen best in FIG. 3, is located in pick-up head 16 where it is mounted so that stylus **15*a* can rest in a groove of disc 13**.

Pick-up head 16 can be any conventional type pick-up head which is generally used for this purpose and is light in weight. It is preferred however, that the pick-up head be molded with phonograph pick-up arm 17 so that it is an integral part thereof.

Phonograph pick-up arm 17 is an elongated light weight member having a vertical opening or slot 18 therein. Slot 18 lies with its major axis longitudinal, and provides an opening from the top surface to the bottom surface of the pick-up arm so that shaft 19, which is mounted on surface 11 by means of mount 20, can pass through slot 18 to provide a suspension for the pick-up arm at bearing 21. Needle end **19*a* of shaft 19 and bearing seat 21*a* of bracket 22 which is attached to pick-up arm 17 with a portion thereof disposed above the slot combine to form bearing 21. Thus pick-up arm 17 rests upon shaft 19 since the shaft passes through slot 18 in the pick-up arm and engages bracket 22 at bearing 21**.

Phonograph pick-up arm 17 is composed of two channel members **17*a* and 17*b* which are placed one within another so that channel 17*b* lies within channel 17*a* with the bases of each of these channels away from one another. Channels 17*a* and 17*b* are tapered slightly at one end and provide light weight hollow phonograph pick-up arm 17**.

I prefer to use a plastic material for these channel members, and I prefer to have pick-up head 16 an integral part of channel **17*a* so that it can be molded with channel 17*a*. The molded plastic head is then an integral part of the arm and stylus assembly 15 can be inserted within head 16** during the course of manufacture.

Slot 18 is then the combination of two slots—slot **18*a* in channel 17*a* and slot 18*b* in channel 17*b*. When the channels 17*a* and 17*b* are placed together so that the phonograph pick-up arm is assembled slots 18*a* and 18*b* lie one over the other thereby forming slot 18**.

Bracket 22 is attached to the underside of phonograph pick-up arm 17 at its end by means of screws 23 and 24. Bracket 22 is composed of heel portion **22*a* and top portion 22*b* which are parallel members joined by sides 22*c* and 22*d* to form slot 25, in the bracket. Heel portion 22*a* is rigidly fastened to the underside of the phonograph pick-up arm and is slightly wider than the arm, so that extensions 22*c* and 22*d* can pass on either side of phonograph pick-up arm 17 to join at toe portion 22*b* whereat bearing seat 21*a*** is located.

Thus the slot formed by sides **22*c* and 22*d* of bracket 22 is sufficiently wide so that the end of the phonograph pick-up arm can pass through it and the lower portion of phonograph pick-up arm 17 can lie on the top of heel portion 22*a* of bracket 22**.

Figure 5:
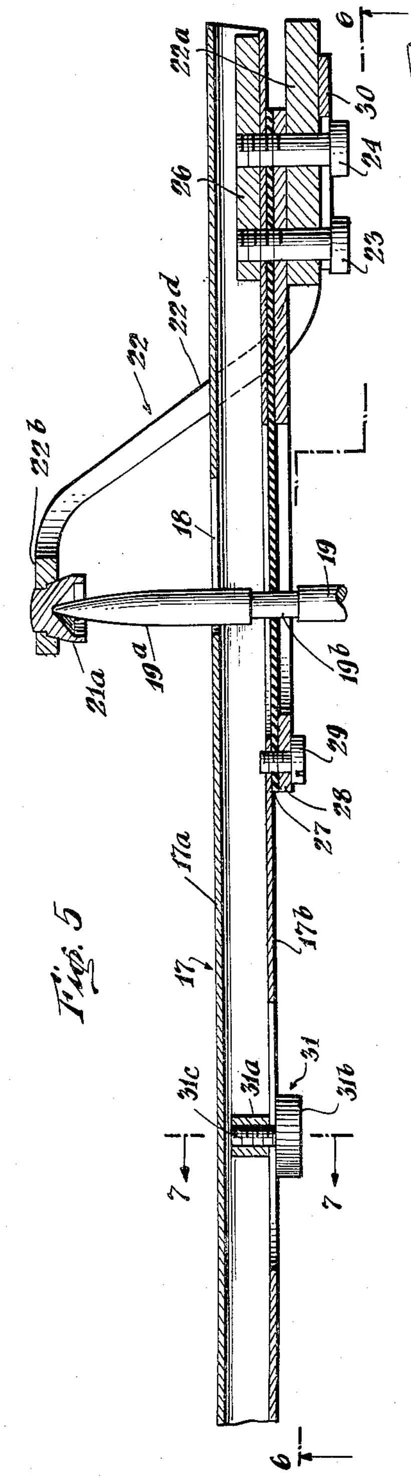
FIG. 5 is a partially sectional fragmentary view of the phonograph pick-up arm illustrated in FIG. 1, showing in detail the arm suspension means.
Figure 6:
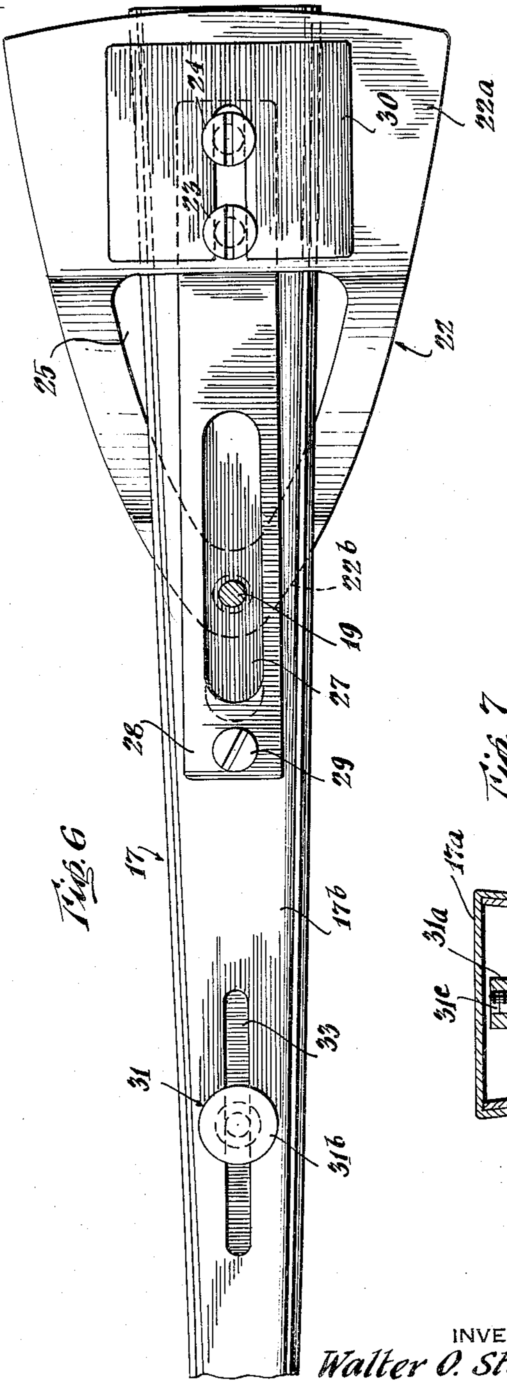
FIG. 6 is a partially sectional view taken along the line 6—6 in the direction of the arrows as indicated in FIG. 5.
Figure 7:
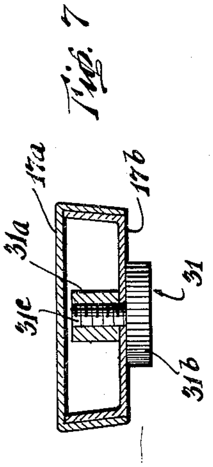
FIG. 7 is a sectional view taken along the line 7—7 in the direction of the arrows as indicated in FIG. 5, showing in detail the forward adjustable balancing means.

As seen best in FIG. 5, bearing 21 is composed of seat **21*a* and needle portion 19*a* of shaft 19 which seats in bearing seat 21*a*. Insert 26 is attached to channel 17*a* so that screws 23 and 24 can be rigidly fastened to phonograph pick-up arm 17**.

Although bracket 22 has been found to be suitable for the purpose, it is not necessary for the successful use of the invention to have a bracket specifically formed as bracket 22. It is necessary only that an attachment be made to the phonograph pick-up arm which will allow an extension thereof to form the needle bearing seat.

A strip of damping material 27 is provided beneath arm 17 and surrounding slot 18 so that the damping strip lies at all times between shaft 19 and slot 18*b* in channel 17*b*. The damping strip can be any material suitable for this purpose. In this embodiment of the invention rubber is used and the configuration thereof is important only in that the rubber prevent contact of the pick-up arm and shaft 19. Damping strip 27 is mounted on pick-up arm 17 by means of bracket 28 which has an opening therein in the form of a slot which allows the shaft 19 to pass through it.

One end of bracket 28 is fastened to the underside of the phonograph pick-up arm by means of screw 29 forward of slot 18 and the other end of bracket 28 is fastened to the underside of phonograph pick-up arm 17 by means of screws 23 and 24. Bracket 28 passes through slot 25 in bracket 22 and lies between bracket 22 and the lower surface of the phonograph pick-up arm at the rear end thereof.

It is noted that portion 19*b* of shaft 19 is formed with a decreased diameter in the area of the damping strip. This construction is desirable in order to allow the damping strip to better encompass shaft 19.

Weight 30 is provided at the heel portion of bracket 22 and serves as a counter-balance for the forward portion of phonograph pick-up arm 17. The single needle bearing 21 provides the only suspension for phonograph pick-up arm 17, and the moments of the needle bearing in the counter-clockwise direction as seen in FIG. 3 which result from the weight of the phonograph pick-up arm and the weight of the head and stylus assembly must be counter-balanced by a moment on the right side of the bearing point operating in a clockwise direction. Counter-balance weight 30 provides such a clockwise moment. Counter-balance weight 30 is fastened to the underside of the heel of bracket 22 by means of screws 23 and 24 passing therethrough.

A second weight is provided beneath the phonograph pick-up arm on the side of the needle mounting opposite weight 30 so that the tracking force can be precisely adjusted. The second weight is designated generally in the figures, by the numeral 31, and actually consists of metal piece 31*a*, knob 31*b* and threaded shaft 31*c* which extends from the knob as a screw portion into metal piece 31*a*. The metal piece 31*a* is situated between channel members 17*a* and 17*b* and threaded portion 31*c* of knob 31*b* extends from beneath the phonograph pick-up arm through slot 33 in channel 17*b*. The diameter of knob 31*b* and weight of 31*a* are both larger than the small diameter of slot 33, so that the weight 31*a* will remain between members 17*a* and 17*b*.

The tracking force or pressure of stylus 15*a* upon disc 13 therefore is readily adjustable through a range by sliding knob 31*b* either towards or away from the needle mounting. If it is desired that a greater tracking force be achieved the counter clockwise moment about the needle mounting must be increased. To do this, the knob is turned counter-clockwise slightly and the threaded portion of the knob is withdrawn slightly from weight 31*a*. The knob is then slid in a direction away from the needle mounting. When the desired tracking force has been achieved, the knob is turned in a clockwise direction so that the threaded portion thereof will extend further into the threaded insert in weight 31*a*, thereby causing weight 31*a* and the knob to tightly grasp the edge of slot 33 in channel 17*b*. In this manner the tracking force may be precisely determined. Also markings may be made on the side of the phonograph pick-up arm to indicate the tracking force at a specific position of the knob.

Metal hook 34 is fastened to phonograph pick-up arm 17 by means of bracket 35 and screws 36 and 37. This metal hook is used to allow an operator to move the phonograph pick-up arm when it is desired.

The rest member, which is designated generally by the numeral 37 in FIG. 1, maintains the phonograph pick-up arm in a rest position when it is desired. Rest 37 is mounted on surface 11 by means of mount 38 and shaft 39 which extends vertically upwardly to support brushes 40 and 41 at the uppermost portion thereof. Rest 37 is adjusted so that vertical post 39 is at the proper height. When properly adjusted, the arm will be level with surface 11 when it is on the rest. The horizontal portion 39*a* of the rest is arranged so that the curved underpart of the stylus cartridge can rest upon it. Brush 40 is adjusted both vertically and rotationally on the post so that the tips of the bristols will lightly brush the stylus tip when the arm is moved to rest thereby cleaning it.

When it is desired to track disc 13, pick-up arm 17 having been at rest, is rotated about the single axis 19 and stylus 15*a* is placed in a groove of the record. When the record is completed and the phonograph pick-up arm is returned to rest it is laid upon horizontal portion 39*a* of rest member 37.

The phonograph pick-up arm is mounted so that its under-surface is parallel to the surface of disc 13. Arm leads, not shown, can pass from phonograph pick-up head 16 through phonograph pick-up arm 17 and out the rear thereof to the amplifying unit.

The single needle bearing provides for lateral and vertical suspension and the damping strip provides for lateral damping as well as rotational and vertical damping. The natural period of vibration of the system is low, and the mounting acts as a low pass mechanical filter and isolates the arm from the table. Under these conditions, if the surface 11 is moved, it can vibrate under the phonograph pick-up arm without disturbing the needle since the force is transmitted through mounting 20 and shaft 19 where it is damped. Such a construction also allows the stylus to be a pivot point so that it does not rock to create an additional signal when the surface 11 is caused to vibrate. The complete unit is only a fraction of the weight of other phonograph pick-up arms.

Thus, among others, the several objects in the invention as specifically aforenoted, are achieved. Obviously, numerous changes in contsruction and rearrangement of parts might be resorted to without departing from the spirit of the invention as defined by the claims.

I claim:

1. A phonograph pick-up arm assembly comprising: an elongated, straight, relatively rigid pick-up arm having a longitudinally extending slot formed vertically therethrough a short distance from a first end of the arm; a pick-up head mounted adjacent the other end of the pick-up arm and having a stylus assembly with a projecting stylus for tracking the groove of a record; a bearing mounting for said pick-up arm assembly in the form of a pin having means for mounting it vertically so as to project upwardly through the slot in the pick-up arm and formed with a tapered upper end disposed above the pick-up arm when the parts are thus assembled and a bracket secured to the pick-up arm adjacent the first end and extending upwardly above the pick-up arm and formed with an inverted cup-shaped bearing seat positioned vertically above the center of gravity of the pick-up arm assembly in alignment with said slot and cooperable to engage said tapered end portion of the pin to support the pick-up arm assembly for universal movement, said pick-up arm assembly including means whereby it is transversely balanced when said cup-shaped bearing seat is in engagement with the tapered end portion of the pin and the stylus is in tracking engagement with a record groove; and means for counterbalancing said pick-up arm longitudinally in the form of weighted means mounted on said pick-up arm and adjustable longitudinally thereof.

2. A phonograph pick-up arm assembly as set forth in claim 1 in which the weighted means for counter-balancing said pick-up arm comprises a relatively larger weight adjustably mounted adjacent the first end of the pick-up arm on the opposite side of the bearing assembly from the pick-up head and a relatively lighter weight adjustably mounted on said pick-up arm between the bearing assembly and the pick-up head to vary the tracking force of the stylus.

3. A phonograph pick-up arm assembly as set forth in claim 2 in which resilient damping material is secured to the pick-up arm along the slot to dampen oscillations of the arm.

References Cited in the file of this patent

UNITED STATES PATENTS

| | | |
|---|---|---|
| 2,060,117 | Proctor | Nov. 10, 1936 |
| 2,346,733 | Dally | Apr. 18, 1944 |
| 2,604,326 | Lynch | July 22, 1952 |
| 2,676,806 | Bachman | Apr. 27, 1954 |

FOREIGN PATENTS

| | | |
|---|---|---|
| 1,105,702 | France | Dec. 7, 1955 |